United States Patent [19]

Larker

[11] 4,152,111

[45] May 1, 1979

[54] FURNACE FOR TREATMENT OF MATERIAL AT HIGH TEMPERATURE AND PRESSURE

[75] Inventor: Hans Larker, Robertsfors, Sweden

[73] Assignee: ASEA Aktiebolag, Vesteras, Sweden

[21] Appl. No.: 860,891

[22] Filed: Dec. 15, 1977

[30] Foreign Application Priority Data

Dec. 20, 1976 [SE] Sweden .............................. 7614279

[51] Int. Cl.² ............................................. F27B 5/04
[52] U.S. Cl. .................................... 432/205; 13/31 R
[58] Field of Search ............................. 13/31; 432/205

[56] References Cited

U.S. PATENT DOCUMENTS

| | | | |
|---|---|---|---|
| 3,427,011 | 2/1969 | Boyer et al. | 432/205 |
| 3,732,068 | 5/1973 | Larker | 432/205 |
| 3,775,043 | 11/1973 | Johansson et al. | 432/205 |

FOREIGN PATENT DOCUMENTS 2722065  12/1977  Fed. Rep. of Germany ........... 432/205

*Primary Examiner*—John J. Camby
*Attorney, Agent, or Firm*—Watson, Cole, Grindle & Watson

[57] ABSTRACT

Disclosed is an elongated cylindrical furnace that includes a housing which defines an internal pressure chamber. An annular heater is disposed in the chamber in surrounding relationship to a centrally disposed material treatment space and an insulation layer is disposed in surrounding relationship to the heater. An annular gas impermeable wall is disposed in the chamber between the heater and the treatment space to isolate the latter from the space outside the wall where the heater is located. The outer heater space and the inner material treatment space are each provided with a respective source of pressurized gas for pressurization of the furnace to operating pressure. Thus, the amount of pressurized gas in contact with the material undergoing treatment is minimized and limited by the volume of the inner space and contact between gas from the inner space which may have become contaminated by contact with the material undergoing treatment and hard to clean furnace components in the outer space is limited by the presence of the wall. Also disclosed are various means for controlling the relative gas pressures in the inner and outer spaces.

11 Claims, 4 Drawing Figures

FURNACE FOR TREATMENT OF MATERIAL AT HIGH TEMPERATURE AND PRESSURE

BACKGRUND OF THE INVENTION

The present invention relates to furnaces which have heaters enclosed in pressure chambers for treating materials at a high temperature, preferably above 700° C., while maintaining such materials in a gaseous atmosphere at a high pressure, preferably above 500 bar.

Gases entering such a furnace during the charging and/or pressurization thereof may attack constructionsl components of the furnace in the pressure chamber. Moreover, contact with the material undergoing treatment may contaminate the pressure medium. The latter is particularly true in cases where the furnace is used for enclosing or sealing radioactive waste in a solid material such as a ceramic. In such case the gas in the pressure chamber may be contaminated by radioactive material by coming into direct contact with a leaking press capsule whereby furnace and pressure chamber components which are difficult to clean may become contaminated.

SUMMARY OF THE INVENTION

The foregoing problems, shortcomings and drawbacks are minimized, if not eliminated completely, by the present invention which provides a furnace for treatment of materials at high pressures and temperatures comprising housing means defining an internal pressure chamber for containing pressurized gas; gas impermeable wall means in said chambers dividing the latter into an inner material treatment space and an outer space; and passageway means defining a first passageway for establishing fluid communication between said inner space and a source of a pressurized gas and a second passageway for establishing fluid communication between said outer space and a source of pressurized gas whereby said spaces may be pressurized separately to thereby minimize the amount of pressurized gas in contact with the material undergoing treatment in said inner space and to thereby limit contact between gas from said inner space which may have been contaminated by the material being treated and furnace components disposed in said outer space. Preferably the furnace may include means for controlling the relative pressures in the inner and outer spaces to avoid undue stressing and/or deformation of the wall means. Generally the control means may be used for limiting the pressure differential between the spaces, for maintaining a higher pressure in the outer space and/or for maintaining the spaces at substantially the same pressure.

DETAILED DESCRIPTION OF THE INVENTION

Figure 1:
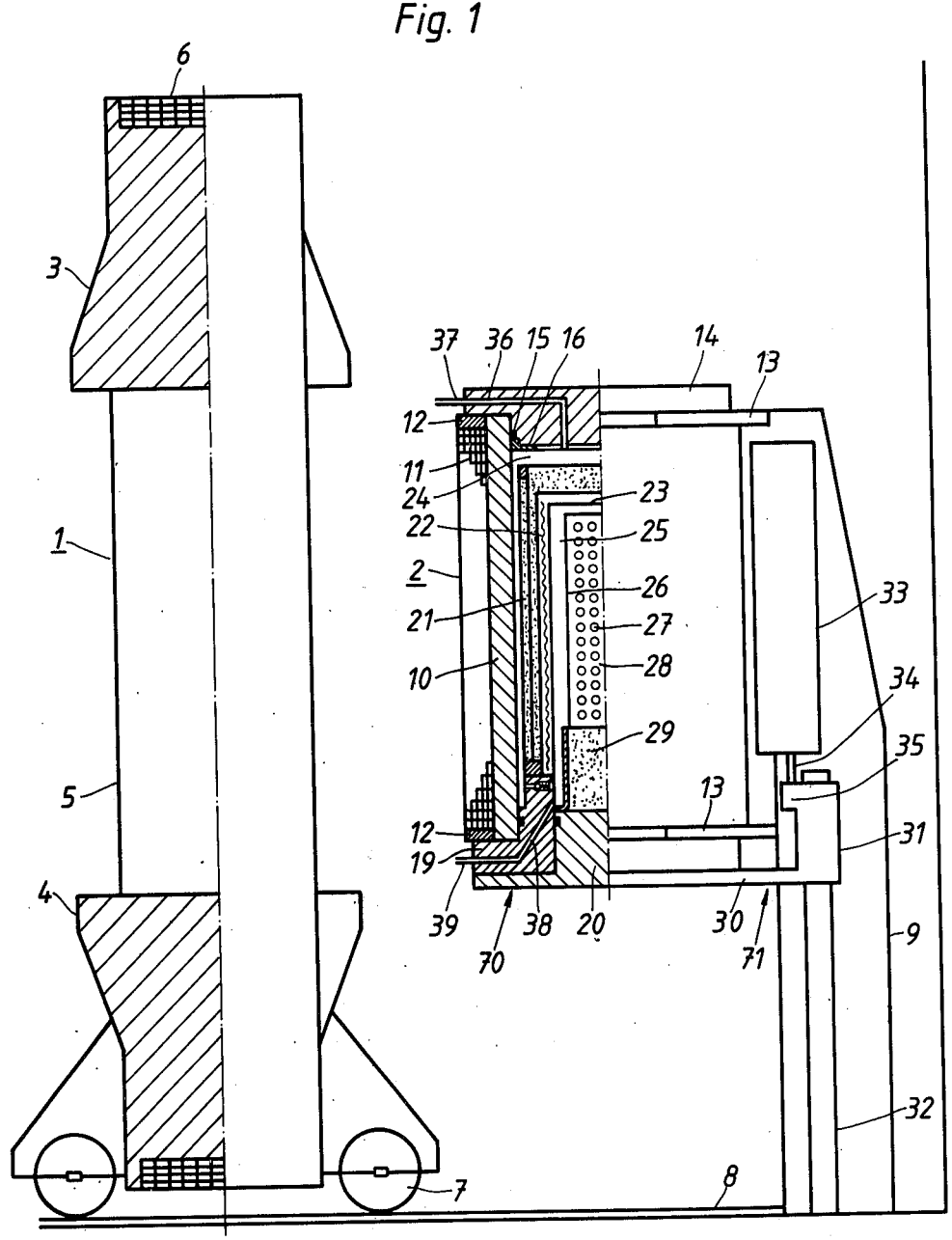
FIG. 1 is a side elevational view, partly in cross-section, illustrating press equipment which includes a stationary high pressure furnace embodying the concepts and principles of the present invention and a moveable press stand.

Illustrated in FIG. 1 is a press stand 1 which is mounted for movement between the position shown in FIG. 1 and a position in which it surrounds a high pressure furnace 2. Press stand 1 consists of yokes 3 and 4, intermediate spacers 5 and a strip sheath 6 that holds the components together. Stand 1 is supported by wheels 7 running on rails 8. High pressure furnace 2, which is supported by a column 9, is constructed to include an inner cylindrical tube 10 and an annular strip sheath 11 surrounding tube 10. End rings 12 are included to secure strip sheath 11 axially and each is attached to a respective bracket 13, by means of which high pressure furnace 2 is mounted on column 9. Furnace 2 has an upper end closure 14 which projects into the interior of tube 10 and sealing ring 15 is positioned between tube 10 and the projection of end closure 14. Ring 15 is retained by a holder ring 16 as shown in FIG. 1 and ring 16 is attached to closure 14 by means of bolts which are not shown.

Furnace 2 is provided with a lower, divided end closure 70 which consists of an outer annular portion 19 that projects into the interior of tube 10, and an inner closure portion 20 that projects into the center of portion 19. Portion 19 is removably affixed to tube 10 by attachment means which are not shown.

A hat or hood shaped insulating sheath 21 rests on annular portion 19 of the end closure as can best be seen in FIG. 1. Heating elements 22 are disposed inside of insulating sheath 21 and a generally hat or hood shaped gas impermeable separating wall 23 is disposed centrally of heating elements 22. Separating wall 23 is gastightly joined to end closure portion 19. Thus, tube 10, closure 14 and closure 70 present a housing defining an internal pressure chamber for containing pressurized gas while wall 23 provides gas impermeable wall means in the chamber dividing the latter into an outer space 24 and an inner space 25.

Insulating portion 21 and heating elements 22 are disposed in space 24 while space 25 is a material treatment space for workpieces such as, for example, a capsule 26 that may be filled with a mixture of radioactive material 27 and a glass-forming powder 28. Such mixture forms a solid body when subjected to a high temperature under the influence of a high pressure exerted by a gas in the pressure chamber. Capsule 26 rests on an insulating bottom 29 carried by lower end closure portion 20.

Since the wall 23 is disposed inside heating elements 22 and isolates space 24 from space 25, the amount of gas which makes immediate contact with the material undergoing treatment, such as capsule 26, and which may become contaminated by radioactive materials, for example, in the case of leakage of the capsule is minimized and contact between any gas from space 25 which may have been thusly contaminated and hard to clean furnace components disposed in space 24 is limited.

Figure 3:
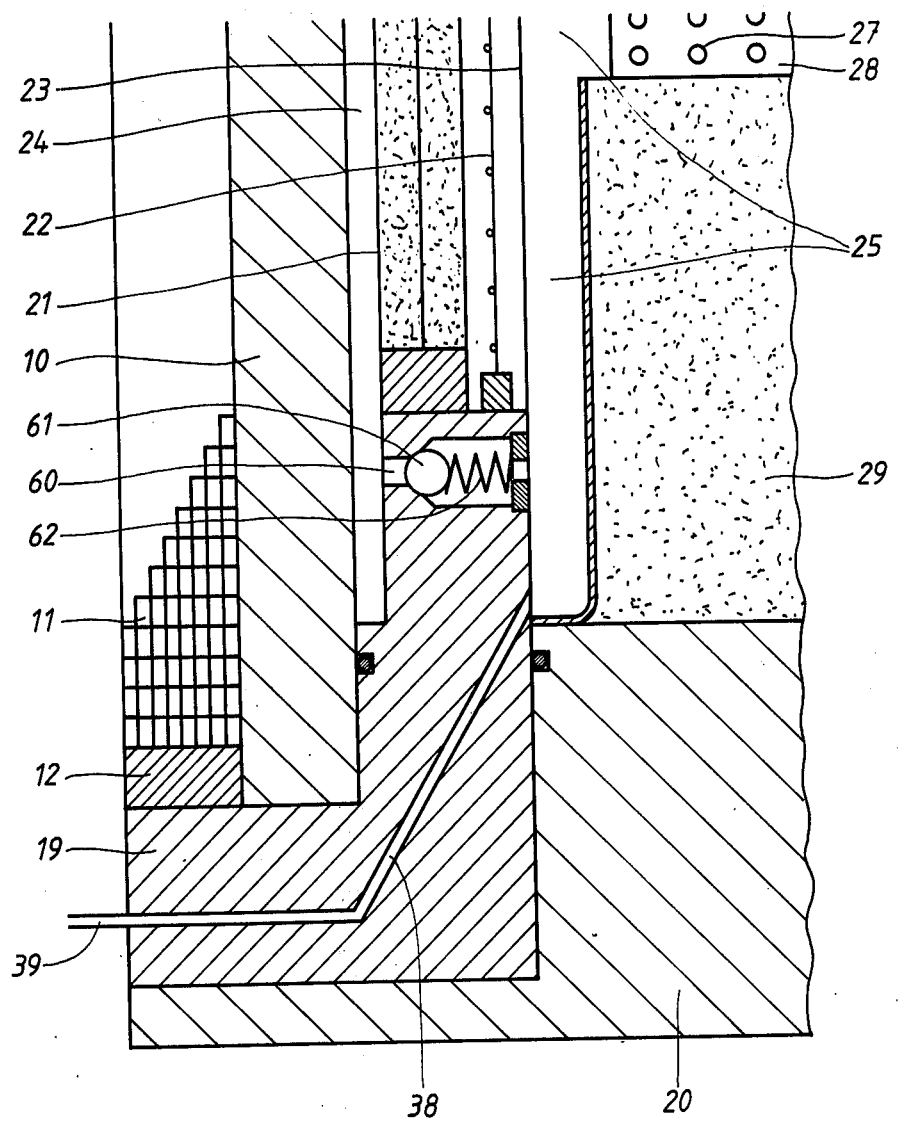
FIG. 3 is an enlarged cross-sectional view illustrating a portion of the furnace of FIG. 1.

As can be seen in FIGS. 1 and 3, annular portion 19 supports insulating portion 21, heating elements 22 and separating wall 23. Inner portion 20 of end closure 50 is supported, on the other hand, by a lifting mechanism 71 by which portion 20 may be easily lowered and raised to charge the furnace. Mechanism 71 includes a guide sleeve 31 which is connected to closure portion 20 by a bracket 30. Sleeve 31 follows a guide 32. End closure 20 may be lowered and raised by means of an operating cylinder 33 that has a piston rod 34 fastened to a bracket 35 on sleeve 31.

A passageway in the nature of a channel 36 in upper end closure 14 and a conduit 37 are provided for establishing fluid communication between space 24 and a source of pressurized gas in the nature of a gas supply system 72. Another passageway in the nature of a channel 38 in the annular portion 19 of the lower end closure and a conduit 39 is provided for establishing fluid communication between space 25 and gas supply system 72. Thus, spaces 24 and 25 may be pressurized separately.

Figure 2:
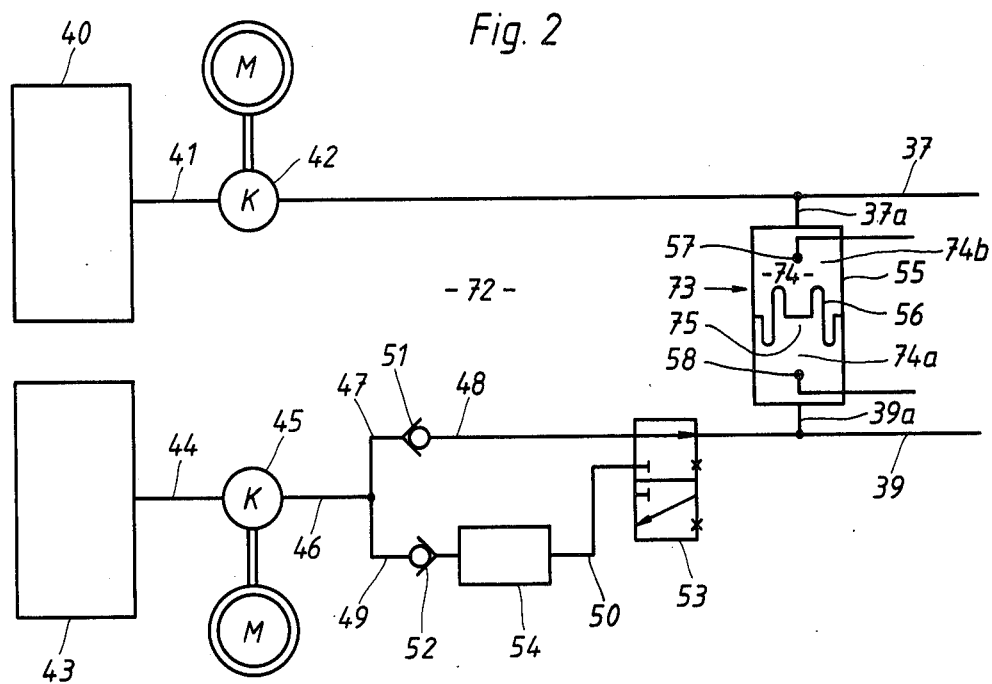
FIG. 2 is a schematic view illustrating a high pressure gas supply system useful in connection with the furnace of the present invention.

System 72 for supplying gas to pressure furnace 2 as illustrated in FIG. 2 and comprises a first gas container 40 which communicates via a conduit 41, a compressor 42, conduit 37 and channel 36, with the "clean" outer space 24 of furnace 2. System 72 also comprises a second gas container 43 which communicates, via a conduit 44, a compressor 45, conduits 46, 47, 48, 49 and 50, valves 51, 52 and 53, a filter 54, conduit 39 and channel 38, with the "potentially contaminated" inner space 25 of furnace 2. Through the use of reversing valve 53, gas may be conducted along two different paths. Thus, gas from container 43 may be supplied to space 24 of pressure furnace 2 through conduits 47 and 48 and check valve 51 and may be returned from space 24 to container 48 through conduit 50, filter 54, check valve 52 and conduit 49. The purpose of the check valves is to prevent the flow of gas in the wrong direction through filter 54. Thus, the return of accumulated dust to the furnace 2 is prevented. Compressors 42 and 45 are each designed with manifolding and valve systems (not shown) to allow gas to be pumped in either direction. Thus, gas can be pumped to as well as from the furnace 2.

System 72 preferably includes a pressure-equalizing sensor 73 comprising a housing 55 having a hollow interior 74 and a gastight mobile diaphragm 56 which divides interior 74 into separated segments 74a and 74b. Sensor 73 also includes a conduit 39a for intercommunicating interior segment 74a with conduit 39 and thereby space 25 and a conduit 37a for intercommunicating interior segment 74b with conduit 37 and thereby space 24. Sensor 73 includes sensing members 57 and 58 which operate to deliver a signal to influence a pressure regulation system (not shown) when the displacement of the diaphragm 56, under the influence of a pressure difference between segments 74a and 74b which is exerted across diaphragm 56, brings element 75 on diaphragm 56 into contact with either of the sensing members 57 or 58. The pressure regulation system may operate to change the pressure in either conduit 37 or conduit 39. Thus, sensor 73 may be used to limit or prevent the development of any significant pressure differential between conduits 37 and 39 and thereby between outer space 24 and inner space 25 of furnace 2. To this end, diaphragm 56 may be spring biased in a direction such that a slightly higher pressure may be maintained in conduit 37 and therefore in outer space 24 of the furnace 2. Thus, passage of gas from space 25 to space 24 will be prevented in the event of leaks in wall 23.

FIG. 3 illustrates an overflow opening in the nature of a channel 60 in ring 19 for intercommunicating spaces 24 and 25. A valve member 61 disposed in channel 60 is biased in a closing direction by a spring 62. Valve member 61 opens at a certain overpressure in space 24 to permit gas flow into space 25.

Figure 4:
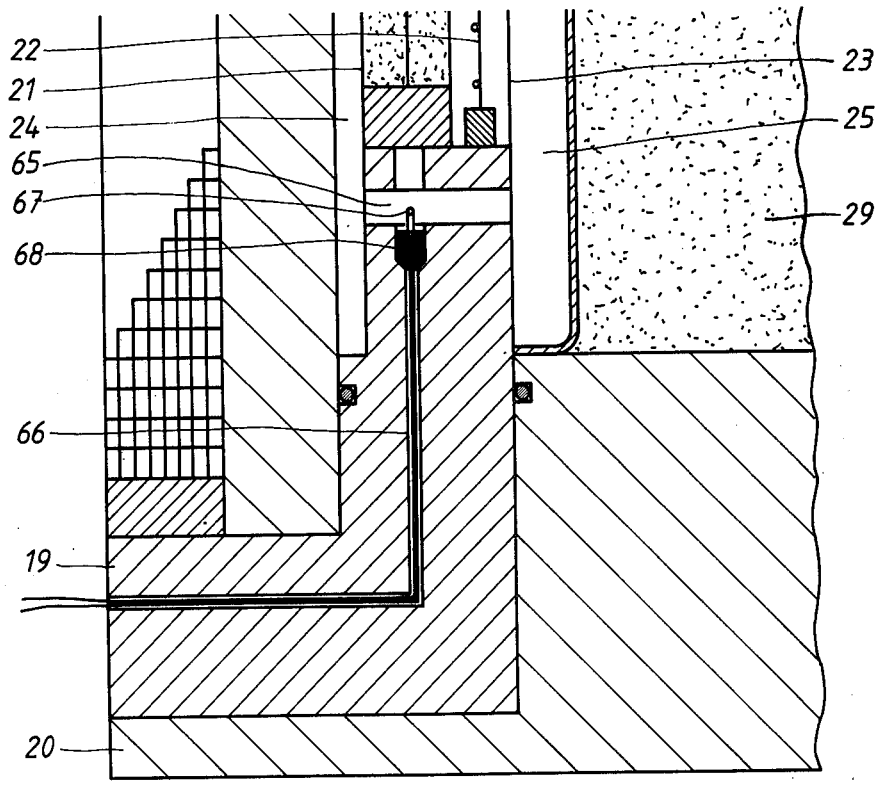
FIG. 4 is an enlarged cross-sectional view similar to FIG. 3 but illustrating an alternative embodiment of the invention.

FIG. 4 illustrates an embodiment of the invention wherein an overflow opening in the nature of a channel 65 in ring 19 is included for intercommunicating spaces 24 and 25. Gas may flow freely in either direction between spaces 24 and 25 through channel 65. In this embodiment ring 19 is provided with a bore hole 66 for a thermocouple 67 which projects into channel 65. Hole 66 is enlarged at its junction with channel 65 to facilitate a high-pressure seal 68. Thermocouple 67 may be connected to means for controlling the motor speed of compressors 42 and 45.

As will be readily appreciated by those skilled in the art to which the present invention pertains, the furnaces described above thus include means for controlling the relative pressures in spaces 24 and 25. These means may include means such as sensor 73 which influences pressure regulating means so that a somewhat higher pressure is maintained in outer space 24 than in inner space 25 where material undergoing treatment is located. Thus, any transfer of gas between spaces 24 and 25 is in the direction from the outer "clean" space 24 and into inner space 25 which may be contaminated by the material being treated. The controlling means may also be designed in such a manner that substantially the same pressure is maintained in spaces 24 and 25. Sensor 73 may be used for such equalization of the pressures in outer space 24 and inner space 25 of furnace 2. To this end sensing members 57 and 58 cooperate with element 75 to provide a signal to influence the gas supply system in such a manner that any pressure difference is reduced. It should be understood that sensor 73 is generally and preferably placed outside the pressure chamber of the furnace 2 and may be connected between supply conduits 37 and 39 as illustrated in FIG. 2.

The pressure control means may alternatively take the form of an opening, such as the pressure equalizing overflow openings 60 or 65, which intercommunicates spaces 24 and 25. Such opening may be permanently open, as in the case of opening 65, or the same may be provided with an overflow valve, such as the valve 61 illustrated in FIG. 3. This valve opens whenever the pressure difference between the outer and inner spaces exceeds a certain value. As mentioned above, it is generally desirable for the pressure in outer space 24 to be greater than the pressure in inner space 25, since it is desirable to prevent outer space 24 which contains insulating sheath 21 and heating elements 22 from becoming radioactively contaminated whereby maintenance and repair work would be hindered because of the radiation.

Since the operating pressure in the pressure chamber of furnace 2 is very high, usually in the range of 500-2000 bar, and since it is desirable to keep the pressure differential between spaces 24 and 25 very small, measurement of pressure differentials and pressure regulation may involve certain difficult problems. By permanently supplying gas to outer space 24 in such an amount that a continuous transfer of gas is maintained from outer space 24 to inner space 25, a regulation may be accomplished without the necessity for measuring small pressure differences. While the furnace is being heated using the just mentioned pressure control mode, a great quantity of gas must be supplied to space 24 such that gas from inner space 25, which is expanding due to heating, is prevented from flowing from inner space 25 to outer space 24. Supervision of the direction of flow may be performed by means of a flow-sensing device placed in the overflow opening which intercommunicates spaces 24 and 25. Such flow-sensing member may be the thermocouple 67 illustrated in FIG. 4. A measured temperature increase in opening 65 indicates a flow of heated gas from inner space 25 to outer space 24 and such information may be utilized, for example, to regulate a compressor so as to increase the supply of gas to outer space 24 sufficiently to obtain the desired direction of flow in the overflow opening.

I claim:

1. A furnace for treatment of materials at high temperatures and pressures comprising:

housing means defining an internal pressure chamber for containing pressurized gas;

gas impermeable wall means in said chamber dividing the latter into an inner material treatment space and an outer space; and passageway means defining a first passageway for establishing fluid communication between said inner space and a source of pressurized gas and a second passageway for establishing fluid communication between said outer space and a source of pressurized gas whereby said spaces may be pressurized separately to thereby minimize the amount of pressurized gas in contact with the material undergoing treatment in said inner space and to thereby limit contact between gas from said inner space which may have been contaminated by the material being treated and furnace components disposed in said outer space.

2. A furnace as set forth in claim 1 comprising means for controlling the relative pressures in said spaces.

3. A furnace as set forth in claim 2 wherein said control means is operable to limit the pressure differential between said spaces.

4. A furnace as set forth in claim 2 wherein said control means is operable to maintain a higher pressure in said outer space than in said inner space.

5. A furnace as set forth in claim 3 wherein said control means is operable to maintain a higher pressure in said outer space than in said inner space.

6. A furnace as set forth in claim 2 wherein said control means is operable to maintain the pressures in said spaces at substantially the same levels.

7. A furnace as set forth in claim 2 wherein said control means comprises a sensor including a housing member having a hollow interior, a gas-tight mobile diaphragm dividing said interior into separated segments, and conduit means for intercommunicating each segment of the interior with a respective one of said spaces whereby any pressure differential existing between the spaces is exerted across the diaphragm.

8. A furnace as set forth in claim 2 wherein said pressure control means includes an opening intercommunicating said spaces to facilitate the overflow of high pressure gas from said outer space to said inner space.

9. A furnace as set forth in claim 8 wherein said pressure control means comprises a valve in said opening permitting flow of gas from said outer space and into said inner space only when the pressure differential existing between said spaces exceeds a predetermined level.

10. A furnace as set forth in claim 8 wherein said pressure control means comprises means for sensing the direction of the flow of gas in said opening.

11. A furnace as set forth in claim 10 wherein the gas in the inner space is generally at a higher temperature than the gas in the outer space and said sensing means comprises a temperature sensing element.

* * * * *